UNITED STATES PATENT OFFICE.

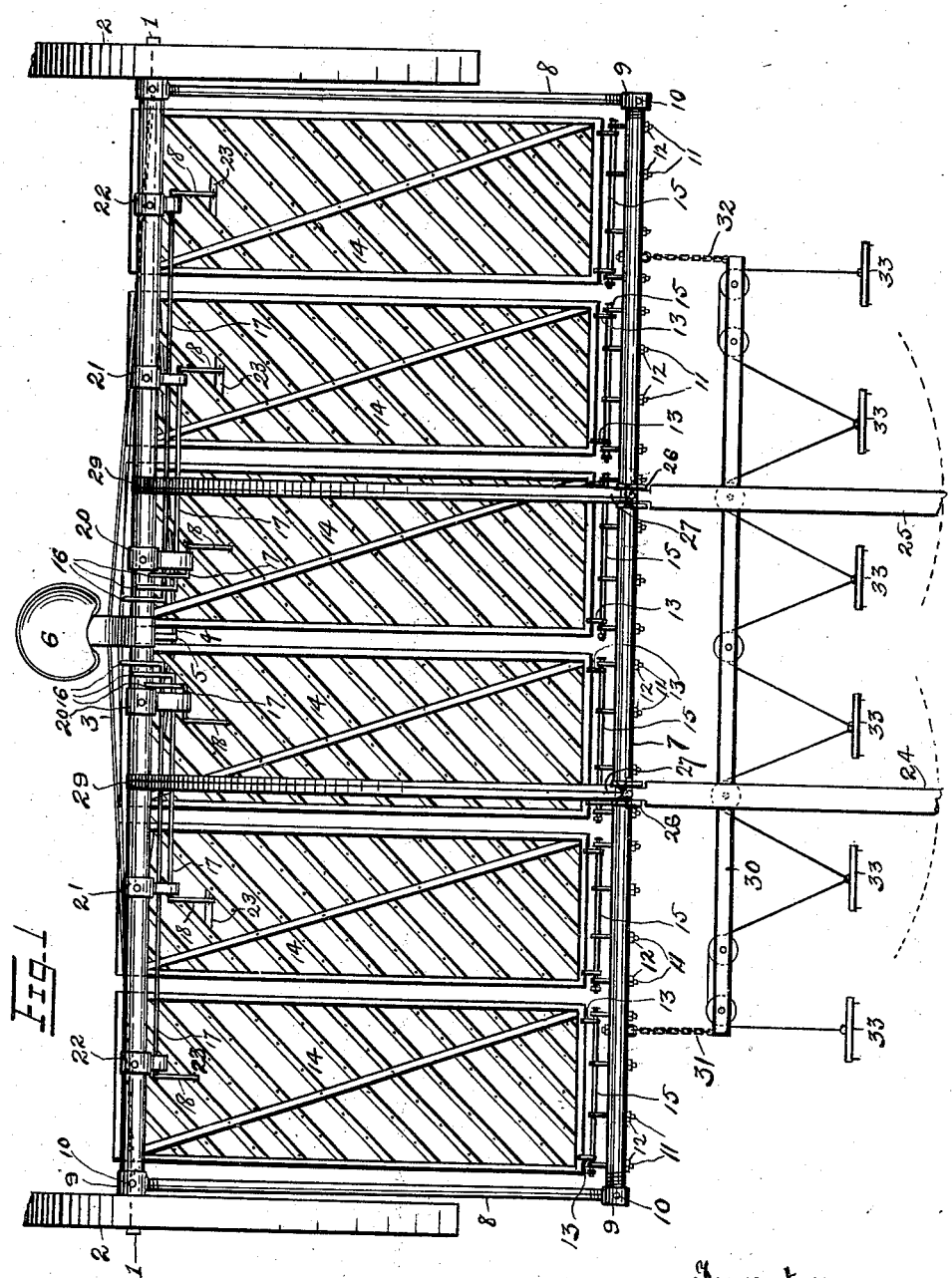

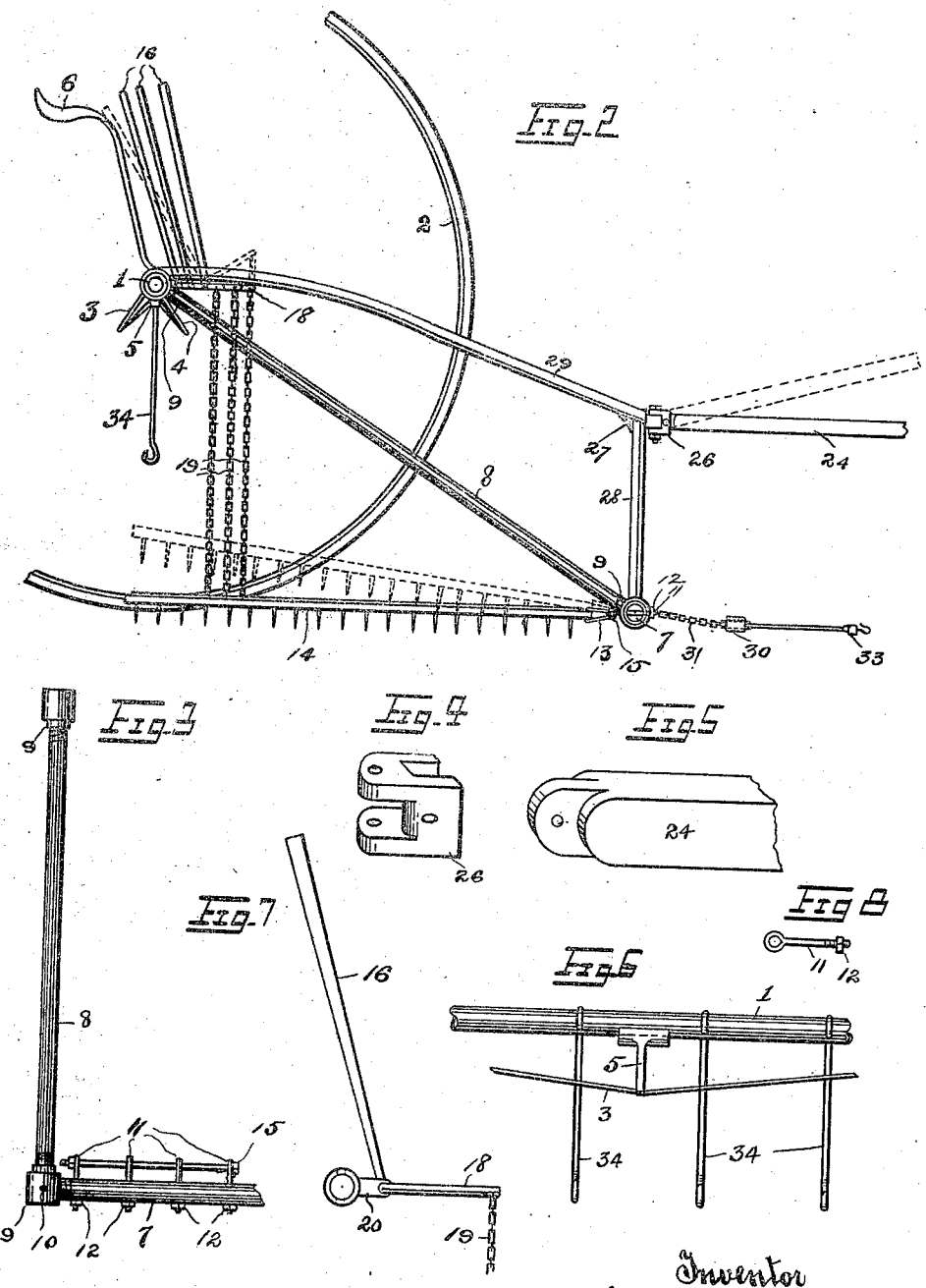

ALEXANDER THEODORE MINTY, OF BRANDON, MANITOBA, CANADA.

HARROW-CART.

1,306,352.   Specification of Letters Patent.   Patented June 10, 1919.

Application filed May 5, 1917. Serial No. 166,636.

*To all whom it may concern:*

Be it known that I, ALEXANDER THEODORE MINTY, citizen of the Dominion of Canada, residing at the city of Brandon, in the Province of Manitoba, in the Dominion of Canada, have invented certain new and useful Improvements in Harrow-Carts, of which the following is a specification.

This invention relates to vehicles used in connection with the ordinary drag harrow, and the objects of the invention are first, to provide a cart of simple and inexpensive construction providing novel means whereby a plurality of harrows may be attached thereto, second, to provide means for raising any harrow independently of the others to relieve it from accumulated trash, third to provide means to render the harrows inoperative while being moved from place to place, and fourth, to provide means to steady the structure while moving or at work and to prevent the draft animals from stepping back into the harrows.

The means by which these and certain other objects of the invention, which will appear as the description proceeds, are attained, will be found fully described in the following specification and then more particularly pointed out in the appended claims, reference also being had to the drawings forming part hereof in which similar characters of reference refer to similar parts throughout the different views, and in which, Figure 1 is a plan view of a cart embodying the invention, and having a plurality of harrows connected therewith.

Fig. 2 is a view of the cart with one wheel removed and showing by dotted lines one of the harrows in raised position.

Fig. 3 is a fragment of the draw bar.

Fig. 4 is an enlarged view of the hinge by which one of the tongues is secured to the cart.

Fig. 5 shows the end of one of the tongues shaped to pivotally connect with the hinge shown in Fig. 4.

Fig. 6 is a central fragment of the axle without the seat and showing the truss used to support the axle and the hooks by which the rear ends of the harrows are carried when being moved from place to place.

Fig. 7 shows one of the lifting levers and the clip by which it is carried from the axle.

Fig. 8 is one of the eye bolts removed from the draw bar.

In carrying out my invention I prefer to use a tubular axle 1 having the wheels 2 of suitable size rotatably mounted thereon at each end, and truss rods 3 and 4 running from end to end and under the bridge 5 which spaces the rods from each other as shown in Fig. 2 and supports the axle at the center. A seat 6 for the driver is provided directly over the bridge 5.

A draw bar 7 preferably also tubular normally rests upon the ground some distance in advance of the axle, and brace rods or tubes 8 extend between and connect the axle and draw bar at each end, these connections being preferably made by means of interiorly threaded pipe fittings 9 of the ordinary T type.

The connecting members may be secured in position by pins 10 which pass through the members they connect.

The draw bar 7 is provided with a plurality of eye bolts 11 which pass through the same and are secured in position by the nuts 12.

Four of the bolts are preferably provided for each harrow and they are positioned so that the links 13 on the harrows 14 will come just within the outer two of the group, and a bolt 15 is then passed through the eyes in the bolts 11 and the links 13 on the harrows, thus flexibly connecting the harrow with the draw bar in a manner preventing it from encroaching upon the ground occupied by the neighboring harrows in the gang.

It will be noted that a separate bolt 15 is provided for each of the harrows 14 so that any harrow in the gang may be disconnected without disturbing the remainder.

It is a well known fact that the teeth of all harrows become fouled from time to time with weeds and trash and require to be relieved by lifting. To perform this operation a lever is provided for each harrow, this in each case consisting of a handle portion 16 standing up beside the seat 6, a lateral portion 17 extending from the handle to a position over the harrow section to which it pertains, and a forwardly projecting arm 18 having a chain 19 at its outer end connecting with the harrow section adjacent the rear end thereof.

The horizontal portions 17 of the levers are rotatably supported in bearings indicated as 20, 21 and 22 clipped on the axle 1 and pinned thereto to preserve their position. It will be noted that in the present case, as there are six harrow sections shown, and as three levers are required on each side of the seat to operate them, the clips 20 being those closest to the seat on each side, are shaped to accommodate all three levers, while those 21 support two, and those 22 but one. In this manner each lever is supported from the axle immediately above the section it is designed to operate, and its chain 19 connects it either directly with the harrow section, or with a cross bar 23 secured to the harrow for the purpose.

When any harrow becomes fouled it is only necessary for the operator to pull the particular lever connected therewith to raise the rear of the harrow to the position indicated by the dotted lines in Fig. 2 when the objectionable matter falls from the teeth.

A pair of tongues 24 and 25 form a novel part of the structure, these being positioned equi-distant from a central line passing through the seat 6, and spaced to permit of two horses being hitched between them. The inner ends of the tongues are pivotally connected for vertical movement to blocks 26 which in turn are hinge connected for lateral movement to the frames 27 on the structure formed from the vertical standards 28 secured to the draw bar 7, and the curved brace members 29 which support the standards from the axle 1.

Thus it will be seen that the tongues have freedom of movement both laterally and vertically as indicated by the dotted lines in Figs. 1 and 2 and perform no function toward the guiding of the cart.

As evener 30 is secured by the chains 31 and 32 at the opposite ends thereof, to the draw bar 7, and whiffletrees, 33 provide means, in the present case, whereby six horses may be hitched to the evener bar, to draw the harrows and cart.

A plurality of long hooks 34 are swingingly secured to the axle 1 and provide means whereby the rear ends of the harrow sections may be hung up and the harrows rendered inoperative when it is desired to move them from place to place.

In operation the horses are hitched as indicated by the position of the whiffletrees in Fig. 1, and as those nearest the tongues 24 and 25 are connected therewith in the usual manner by neck yokes or breast straps, the tongues serve as holdbacks to prevent the cart from running on to the horse's heels when the structure is being moved with the harrows in inoperative position, the tongues further serve to steady the structure to a limited extent when the harrows are in operation, and to keep the draw bar on the ground, but as previously mentioned they are not intended to guide the cart. When the cart is not in use the tongues are merely laid back on the structure out of the way, their method of connection allowing of this.

From the foregoing description it will be seen that my invention not only provides means whereby the operator may ride during the operation of harrowing, which is the function of the ordinary harrow cart, but through the operation of the draw bar provides for a better performance of the operation of harrowing, by maintaining the various sections in their proper positions and preventing them from being lifted out of the ground.

The description further shows that suitable means have been provided for fully effecting the various other objects of the invention as set out in the preamble to this specification.

Having thus fully described my said invention what I claim is:—

1. A harrow cart having an axle, a draw bar adapted to travel upon the ground in advance of the axle parallel therewith, members spacing the draw bar from the axle, spaced frames surmounting the draw bar connected with the axle, and tongues universally connected with the frames.

2. In a harrow cart, an axle and a truss to support the same, a draw bar shaped and adapted to travel on the ground in advance of the axle parallel therewith, spacing members connecting the draw bar and axle, spaced frames surmounting the draw bar and connected with the axle, and tongues universally connected with the frames.

3. In a harrow cart, a tubular axle and a truss to support the same, a tubular draw bar positioned to travel on the ground in advance of and parallel with the axle, tubular braces spacing the draw bar from the axle, spaced curved members secured to the axle and extending forwardly therefrom at a downward inclination to points above the draw bar, vertical members supporting the ends of the curved members from the draw bar, and tongues universally connected with the structures formed by the curved and vertical members.

ALEXANDER THEODORE MINTY.

Copies of this patent may be obtained for five cents each, by addressing the "Commissioner of Patents, Washington, D. C."